US009226453B2

(12) United States Patent
Schoonheere et al.

(10) Patent No.: US 9,226,453 B2
(45) Date of Patent: Jan. 5, 2016

(54) LOOP KNOTTER SYSTEM FOR A BALER

(71) Applicant: CNH America LLC, New Holland, PA (US)

(72) Inventors: Marnix J. Schoonheere, Ichtegem (BE); Sam Magnus, Merchtem (BE)

(73) Assignee: CNH Industrial America LLC, New Holland, PA (US)

( * ) Notice: Subject to any disclaimer, the term of this patent is extended or adjusted under 35 U.S.C. 154(b) by 50 days.

(21) Appl. No.: 14/054,973

(22) Filed: Oct. 16, 2013

(65) Prior Publication Data

US 2014/0103647 A1     Apr. 17, 2014

(30) Foreign Application Priority Data

Oct. 16, 2012   (BE) .................................. 2012/0698

(51) Int. Cl.
  *A01F 15/14* (2006.01)
  *B65H 69/04* (2006.01)

(52) U.S. Cl.
  CPC .............. *A01F 15/145* (2013.01); *B65H 69/04* (2013.01); *B65H 2701/35* (2013.01)

(58) Field of Classification Search
  CPC ........ A01F 15/12; A01F 15/14; A01F 15/145
  USPC .............................. 289/2, 5, 13, 16; 100/8, 29
  See application file for complete search history.

(56) References Cited

U.S. PATENT DOCUMENTS

| | | | | |
|---|---|---|---|---|
| 2,644,703 | A | | 7/1953 | Rudeen |
| 2,670,978 | A | | 3/1954 | Rudeen |
| 3,101,963 | A | * | 8/1963 | Sullivan et al. ................. 289/11 |
| 3,400,959 | A | * | 9/1968 | Grillot .............................. 289/2 |
| 4,074,623 | A | * | 2/1978 | White ............................... 100/3 |
| 4,196,661 | A | * | 4/1980 | Yatcilla et al. ..................... 100/4 |
| 5,829,346 | A | * | 11/1998 | Ast ............................. 100/19 R |
| 6,634,284 | B2 | * | 10/2003 | Parker ............................. 100/2 |
| 7,296,828 | B2 | | 11/2007 | Schoonheere et al. |
| 7,600,470 | B2 | * | 10/2009 | Eylenbosch ................ 100/33 R |
| 7,878,557 | B2 | * | 2/2011 | Eylenbosch et al. ............. 289/5 |
| 8,495,956 | B1 | * | 7/2013 | Demulder et al. .............. 100/32 |
| 8,590,945 | B2 | * | 11/2013 | Schumacher et al. ........... 289/2 |
| 2006/0012176 | A1 | * | 1/2006 | Schoonheere et al. ........... 289/2 |
| 2009/0179102 | A1 | * | 7/2009 | Naaktgeboren et al. ... 242/419.5 |

FOREIGN PATENT DOCUMENTS

DE           361805          10/1922

* cited by examiner

*Primary Examiner* — Shaun R Hurley
(74) *Attorney, Agent, or Firm* — Patrick M. Sheldrake

(57) ABSTRACT

A tying mechanism comprising a bill hook, twine holding device for holding strands of twines, a cutting arm adapted for cutting twines between the bill hook and the twine holding device while moving between a rest position and an extended position, a drive adapted to make the bill hook perform at least a first full rotation and a second full rotation and to move the cutting arm from the rest position to the extended position and back during a full operation cycle to form respectively a first and a second consecutive knot wherein the tying mechanism further comprises a tension regulating mechanism able to provide and regulate the tension exerted to the twine holding device during the operation of the tying mechanism.

16 Claims, 9 Drawing Sheets

LOOP KNOTTER SYSTEM FOR A BALER

CROSS REFERENCE TO RELATED APPLICATIONS

This Patent Application claims priority under 35 U.S.C. §119 to BE 2012/0698 filed on Oct. 16, 2012 titled, "IMPROVED LOOP KNOTTER SYSTEM FOR A BALER" and having Marnix J. Schoonheere and Sam Magnus as inventors. The full disclosure of BE 2012/0698 is hereby fully incorporated herein by reference.

FIELD OF THE INVENTION

The present invention relates to a knotter system, and in particular to a knotter system for a baler for forming two consecutive knots during a single operation cycle.

BACKGROUND OF THE INVENTION

Rectangular bales are able to maintain their shape by means of a series of parallel extending twine loops, provided lengthwise around the bales. Balers typically use automatic knotters by which e.g. two knots are made on every loop for binding a bale. An example of such a knotter system for a baler is disclosed in EP 1 584 227 in the name of the Applicant, the disclosure of which is included herein by reference. The knotter system disclosed in EP 1 584 227 has the advantage that two consecutive knots can be formed during one operation cycle, without the formation of twine tails.

A problem with the knotter system of EP 1 584 227 is that, in particular for high density balers, the twine loop is not able to resist the high pressure exerted by the bale. When the bale is formed and moved out of the baling chamber, the compressed crops forming the bale will expand resulting in pulling on the twine. If this pressure is such that the twine loop cannot resist this pressure, it will open at the weakest point in the loop. In the case of the twine loop formed with the baler of EP 1 584 227, the weakest point in the loop is the standard knot. This type of knot has the problem that due to the way it is knotted, the twine ends are able to slide with relation to each other when being pulled on at each end. That way, the knot will open up.

When using more expensive twine, the resistance against slipping is improved, due to the structure of the twine. These type of twine have an internal netting structure with small barbs on the fibres of the netting structure. Due to this netting structure with the barbs, the twines will be entangled more in the knot and will thus be able to withstand the pulling force on the twines. However, the resistance against slipping is limited and it was noticed that this expensive twine is no longer capable of withstanding the pulling force when high density bales are being formed with a baler as disclosed in EP 1 584 227.

Another problem which was noticed with the knotter system of EP 1 584 227 is that the fibres of the twines are often damaged. This damage occurs due to the fact that the twines or strands are firmly gripped by a twine holder in the twine disk. The contact between the strands and the twine holder and twine disk, in combination with the pulling of the rotating bill hook will result in the damage of some of the fibres. If some of the fibres are damaged, this location in the twine will be a weaker point in the closed loop. Depending on the strength of the formed knots and the degree of damage of the fibres of the twine, it is very well possible that the twines will break at the point in the loop where the strands were held when forming the knots.

Reference is also made to the BE application filed by the Applicant on 16 Oct. 2012 with the title 'Knotter system for a baler', the disclosure of which is included herein by reference. In this application, it was the object of the invention to improve the removal of the second loop knot from the bill hook by maintaining the cutting arm in the extended position after the second rotation of the bill hook. In this application, as is the case with EP 1 584 227, the second knot will be formed as a loop knot, while the first is still a standard knot.

The object of the present invention is to further improve the knotter system of EP 1 584 227 and more in particular to realize a knotting cycle without leaving loose ends while providing two knots with improved resistance against opening of the knot and with a limited damage to the fibres of the twine.

SUMMARY OF THE INVENTION

According to an embodiment of the invention, a tying mechanism comprising a bill hook, twine holding means for holding strands of twines, a cutting arm adapted for cutting twines between the bill hook and the twine holding means whilst moving between a rest position and an extended position, a drive means adapted to make the bill hook perform at least a first full rotation and a second full rotation and to move the cutting arm from the rest position to the extended position and back during a full operation cycle to form respectively a first and a second consecutive knot wherein the tying mechanism further comprises a tension regulating mechanism which is able to provide and regulate the tension exerted to the twine holding means during the operation of the tying mechanism.

By providing a tension regulating mechanism which is able to provide and regulate the tension exerted to the twine holding means during the operation of the tying mechanism, only the needed amount of pressure will be applied by the twine holding means to the strands of twine when this pressure is required during the operation of the tying mechanism. Pressure is only needed during specific periods when the two successive knots are being formed and by only applying tension when needed and with the amount sufficient to be able to form the successive knots, it is now possible to form two knots which are a half-loop knot and a loop knot, two loop knots or two half-loop knots, thus preventing lose twine ends. It was noticed that such knots have a higher tensile strength compared to normal knots.

Also, the twines are only gripped when needed and with a lower tension limiting the pinching of the twines as was the case with the prior art tying mechanisms. Therefore, damage to the twines are reduced to a minimum or even eliminated. Overall, providing and regulating the tension exerted to the twine holding means will result in a closed loop which is stronger having a higher tensile strength.

According to a preferred embodiment the tension regulating mechanism is able to release the tension exerted to the twine holding means during specific timings of the operation of the tying mechanism. By releasing the tension during specific timings of the operation of the tying mechanism, it is assured that tension is applied only when necessary, while removing the tension to prevent damage to the twines while making sure that According to a preferred embodiment the twine holding means comprises a twine disk having notches for receiving the strands of twine and a twine holder able to press against the twine disk such that the notches can be closed off to retain the strands in the notches and wherein the tension regulating mechanism comprises a spring mechanism pressing against the twine holder to urge the twine holder against the twine disk. The tension regulating mechanism further comprises a tension releasing mechanism able to push against the spring mechanism to release the tension exerted by the spring mechanism on the twine holder. The spring mechanism is able to constantly apply tension to the twine holder, while the tension releasing mechanism will push the spring mechanism away when the strands of twines do not need to be held by the twine holder in the twine disk.

According to a possible embodiment, the tension releasing mechanism comprises at least one shoulder connected to the drive means and a plate, the plate being able to move at a first end over the shoulder while pushing at a second end against the spring mechanism, as to release the tension exerted by the spring mechanism on the twine holder. By adding a shoulder to the drive means and using a plate which can move over the shoulder, a minimum of additional components can be used to release the tension when needed.

According to a possible embodiment, the drive means is a knotter disk, and the shoulder is connected to the outer surface of the knotter disk such that, when the knotter disk rotates, the plate will be brought into contact with the shoulder, thus initiating the tension releasing mechanism. By connecting the shoulder to the outer surface of the knotter disk, it is assured that no extra drive means are needed and that the timing with regards to the other moving components can be respected.

According to a possible embodiment, the tension releasing mechanism further comprises a shaft, a first and second nut and a rounded element, the shaft interconnecting the spring mechanism with the plate, the first and second nut and the rounded element in such a manner that, when the first end of the plate is brought into contact with the shoulder, the second end of the plate will push against the spring mechanism, as to release the tension exerted by the spring mechanism on the twine holder.

A through hole is foreseen in the plate to allow passage of the shaft, the through hole being rounded at one end to allow a subsequent connection between the rounded element and the rounded through hole. The through hole is bigger than the second nut, such that the nut is able to slide, at least partially, into the through hole.

Since the contact surface of the shoulder and the contact surface of the spring mechanism are not positioned in the same plane, a rounded element needs to be foreseen, the through hole needs to be rounded and bigger than the second nut to allow the movement by the plate over the shoulder to be transferred to the spring element.

According to another possible embodiment, the releasing mechanism may comprise a bracket connected to the plate, the bracket having a through hole to receive a shaft, the shaft being placed through the through hole of the bracket and a through hole of the spring mechanism to position the plate with relation to the spring mechanism.

The plate is shaped and positioned in relation to the spring mechanism such that, when a first end of the plate moves over the shoulder, the second end of the plate will push against the spring mechanism to release the tension on the twine holder.

According to a preferred embodiment, the tension regulating mechanism is able to apply tension to the twine holding means during specific timings of the operation of the tying mechanism. Now, no tension will be applied to the twine holding mechanism unless during specific timings when tension is needed. That way, the different components will experience less stress and a prolonged lifecycle of the components is accomplished. It is now even possible to use lower quality of material for the components or design them with a less structural strength then when constant tension was applied as was the case with the prior art tying mechanisms.

According to a possible embodiment, the twine holding means comprises a twine holder and a twine disk; wherein the tension regulating mechanism comprises a rod connected to the twine holder and a tension applying mechanism operably connected with the rod, and whereby the tensioning applying mechanism is at its turn operably connected with the drive means such that, during specific timings of the operation of the tying mechanism, the tension applying mechanism is able to apply tension via the rod to the twine holding means.

The outer surface of the knotter disk has at least one bulge such that, when the cam follower is moved over the bulge, the cam follower and spring element will push against the rod, thus urging the twine holder against the twine disk to retain the strands of twine within the twine holding means.

The tension regulating mechanism comprises a adjusting mechanism placed over the rod, which is a threaded rod to adjust the amount of tension applied by the tension applying mechanism to the twine holding means. The nut is moveable over the threaded rod to alter its position on the threaded rod such that the tension of the tension applying mechanism is changed.

According to another embodiment of the invention, a method for operating a tying mechanism to form respectively a first and second consecutive knot in a rope to form a closed loop around a formed bale of crop material is foreseen. The tying mechanism comprises a bill hook for forming the first and second knot when rotating, a twine holding means for holding the strands of rope, the twine holding means comprising a twine disk having notches, and a twine holder to close of the notches of the twine disk, a needle for delivering strands of rope to the twine holding means, a finger for positioning and holding the strands of rope on the bill hook and a knife arm having a knife for cutting the strands to separate the first from the second knot, and a stripping piece for stripping of the formed knot from the bill hook.

The method comprises the steps of:
moving the needle upwards to deliver the strands in a first notch of the twine disk, while draping the strands over the awaiting bill hook;
moving the finger for positioning and holding the strands on the bill hook;
rotating the twine disk to close of the first notch and presenting the second notch to the strands;
rotating the bill hook to commence the forming of the first knot;
moving the needle downwards to deliver the strands in a second notch of the twine disk;
moving the knife arm to cut the strands after the forming of the first knot and to strip the completed first knot of the bill hook;
moving the needle further downwards to drape the strands over the awaiting bill hook;
moving the finger for positioning and holding the strands on the bill hook;
rotating the twine disk to close of the second notch;
rotating the bill hook to commence the forming of the second knot; and
moving the knife arm after the forming of the second knot to strip the completed second knot of the bill hook;
wherein the method further comprises the steps of:
lowering the tension exerted by the twine holder to the twine disk when the bill hook is rotating to form the first knot, and increasing the tension again when the knife arm reaches its cutting position such that the bill hook is able to pull the strands through the notches of the twine disk allowing easy forming of the first knot while providing additional length of free strands to allow the forming of a half-loop or a loop knot; and lowering the tension exerted by the twine holder to the twine disk when the knife arm starts to move to strip of the completed second knot of the bill hook, such that the strands are able to be pulled out of the twine disk, rather than being cut by the moving knife arm.

The step of lowering the tension exerted by the twine holder when forming the first knot commences when the needle moves upwards and ends when the knife arm reaches the cutting position.

The step of lowering the tension when forming the first knot ends beyond the original cutting position, such that the strands are first pulled out of the twine disk before being cut.

BRIEF DESCRIPTION OF THE DRAWINGS

The advantages of this invention will be apparent upon consideration of the following detailed disclosure of exemplary non-limiting embodiments of the invention, especially when taken in conjunction with the accompanying drawings wherein.

DETAILED DESCRIPTION OF THE PREFERRED EMBODIMENT

In the description which follows and in certain passages already set forth, the principles of the present invention will be described in terms of "twine" and "knots" formed in such twine. However, it is to be recognized that such principles extend to wire and twisted junctions of wire as well as twine and knots.

Many of the fastening, connection, processes and other means and components utilized in this invention are widely known and used in the field of the invention described, and their exact nature or type is not necessary for an understanding and use of the invention by a person skilled in the art, and therefore they will not be discussed in significant detail. Also, any reference herein to the terms "left" or "right" are used as a matter of mere convenience, and are determined by standing at the rear of the machine facing in its normal direction of travel.

Figure 1:
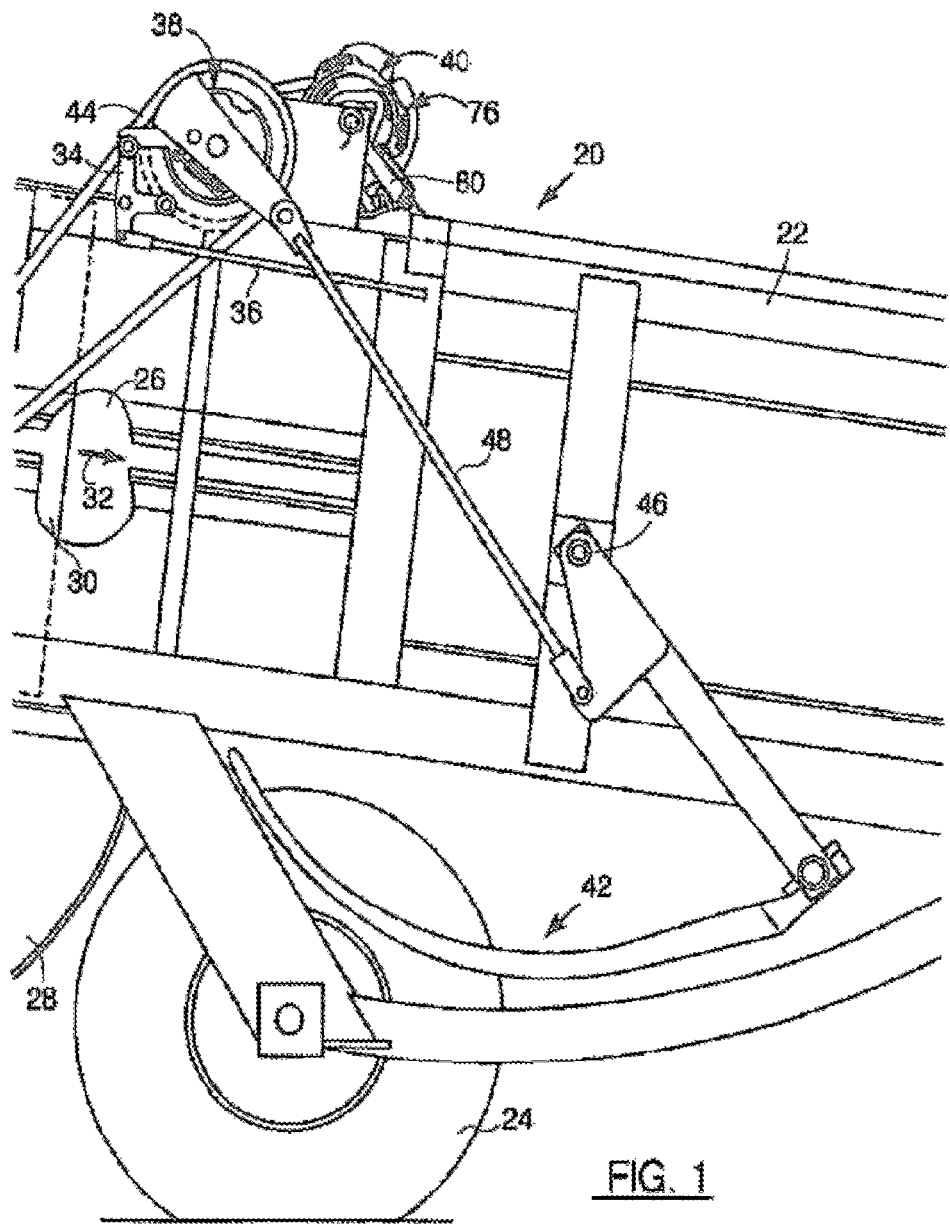
FIG. 1 is a fragmentary, side elevational view of a baler having a double knotter tying mechanism.

The baler 20 illustrated in FIG. 1 has a rectangular bale case 22 that is supported by ground wheels 24. The bale case 22 defines a bale chamber 26 wherein material is pushed in through a curved duct 28. A plunger 30 reciprocates within the bale case 22 to intermittently pack fresh charges of material from the duct 28 rearwardly in the chamber 26 in the direction of the arrow 32. When the bale reaches a predetermined size, a trigger 34 is pulled by a rod 36. This rod 36 engages a dog clutch 38, the clutch 38 in turn being connected to a tying mechanism 40 and a set of needles 42. As will be appreciated, the tying mechanism comprises a set of individual tying mechanisms or knotters 40 provided crosswise on top of the bale chamber 26 at intervals. Each knotter 40 has an associated needle 42 for assisting in forming an individual loop around a finished bale. When the bale needs tying, the dog clutch 38 connects the knotter 40 and their needles 42 via a drive chain 44 to a source of driving power to initiate the tying operation. As the individual knotters 40 all operate in an identical manner, it suffices to describe the present invention in relation to only one such knotter 40.

Figure 18:
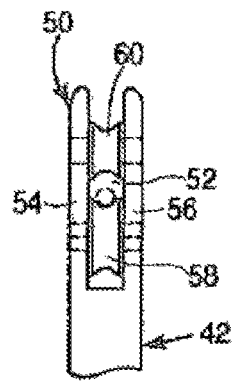
FIG. 18 is an enlarged, front elevational view of the tip of a needle which presents the strands to the knotter, illustrating details of the construction thereof.

The needle 42 is swingably mounted on the bale case 22 by a pivot 46 and is swung back and forth across the bale chamber 26 by a linkage 48, which is activated by the clutch 38. The needle 42 has an "at-home" or rest position fully below the bale case 22 as illustrated in FIG. 1 and a "full-throw" position extending completely across the bale case 22 as illustrated, for example, in FIG. 9. As illustrated most clearly in FIGS. 8 and 18, the tip 50 of needle 42 has an eyelet 52 defined therein by the opposed furcations 54 and 56 of the bifurcated tip 50 in conjunction with a pair of longitudinally spaced, transversely extending rollers 58 and 60. It will be noted that the roller 58 is positioned inwardly from the outer extremity of the tip 50, while the roller 60 is positioned outwardly from the roller 58 more closely adjacent this extremity. Even so, the roller 60 is positioned a short distance inwardly from the outer extremity of the tip 50, and both of the rollers 58 and 60 may be tapered toward their mid points, comparable to a diabolo, so as to provide secure seats for the tying strands.

Figure 2:
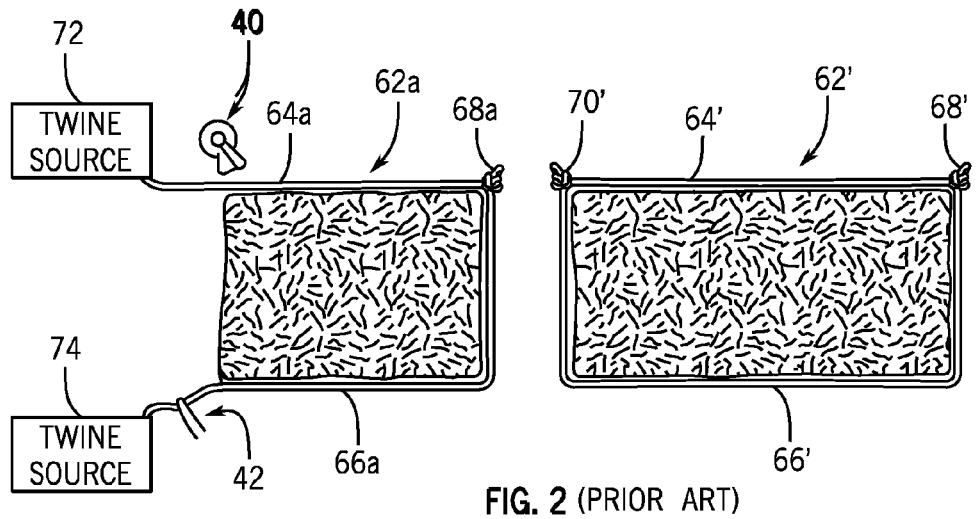
FIG. 2 is a diagrammatic view of a complete and a partial double-knotted loop without the forming of twine tails, and where the first knot is a standard knot and the second knot is a loop knot.

With reference to FIG. 2, to the left of completed loop 62 is a partial loop 62a which is in the process of being formed. The top strand 64a emanates from a source of twine supply 72, while the bottom strand 66a emanates from an entirely separate, second source of twine supply 74. At the particular point in the sequence chosen for illustration, the knot 68a is in existence, and the bale is approaching that length where the needle 42 is ready to swing into operation and present the strands 64a and 66a to the knotter 40 to start an operation cycle in which two consecutive knots are being formed. In a finished bale, the loop 62' is made from two strands of binding material, i.e., one strand 64' along the top side of the bale and a second strand 66' along the bottom side of the bale and its two opposite, vertical ends. The strands 64' and 66' together form the continuous loop 62'. Together, they fully circumscribe the bale. The knot 68 of a bale is typically a so called loop-knot. This means that the ends of the strands 64' and 66' of the knot 68' are released from a retained position so they can be pulled back instead of being cut by a moving knife arm 88 as will be described further to form a small loop on top of the knot. The knot 68' itself, thus holds the ends of the strands 64' and 66', united with the knot 68'. The knot 70' as shown in FIG. 2 is a standard knot, meaning that both ends are pulled completely through the formed knot, thus having two free ends.

Figure 3:
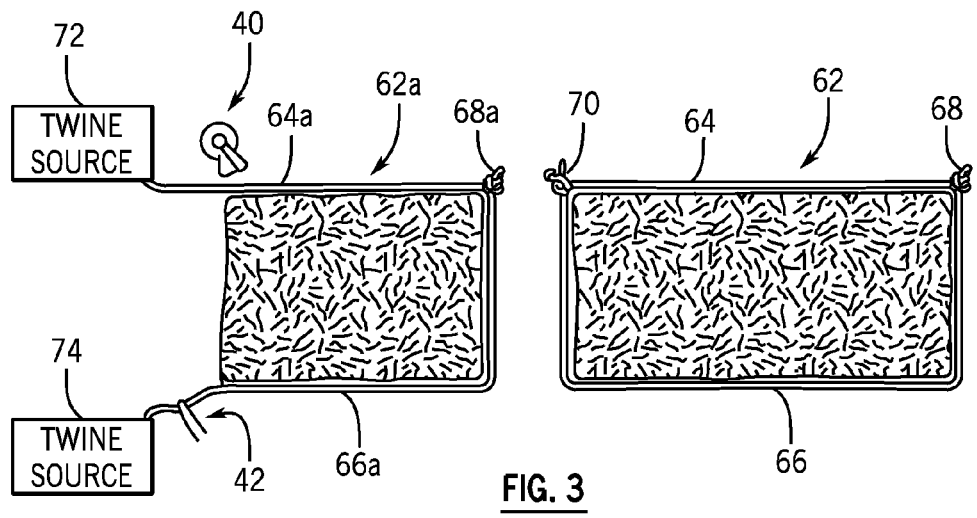
FIG. 3 is a diagrammatic view of a complete and partial double-knotted loop where the first knot is a partial loop knot and the second knot is a loop knot.

In FIG. 3, the finished bale is enclosed by a loop 62 made from two strands of binding material, i.e., one strand 64 along the top side of the bale and a second strand 66 along the bottom side of the bale and its two opposite, vertical ends. As is the case with the prior art bales as shown in FIG. 2, the knot 68 is typically a so called loop-knot, while the knot 70 is now constructed as a so called half-loop-knot. When forming a half-loop-knot, one of the two ends of the twine remains within the formed knot, thus forming the loop, while the other end is pulled completely through the formed knot, thus forming a free end of twine 'escaping' from the knot.

Figure 4:
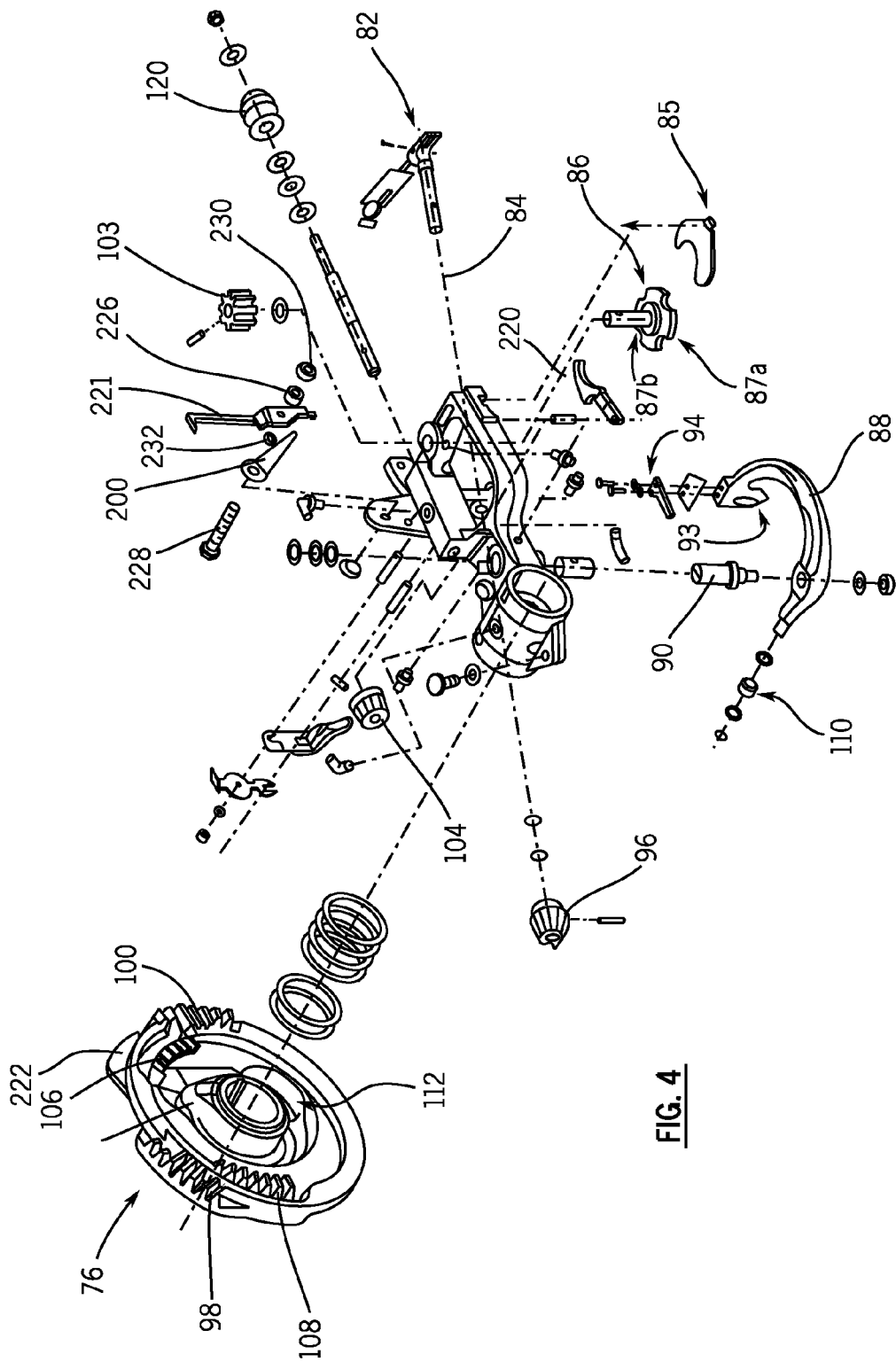
FIG. 4 is an exploded perspective view of an embodiment of the double knotter system of the invention.
Figure 5A:
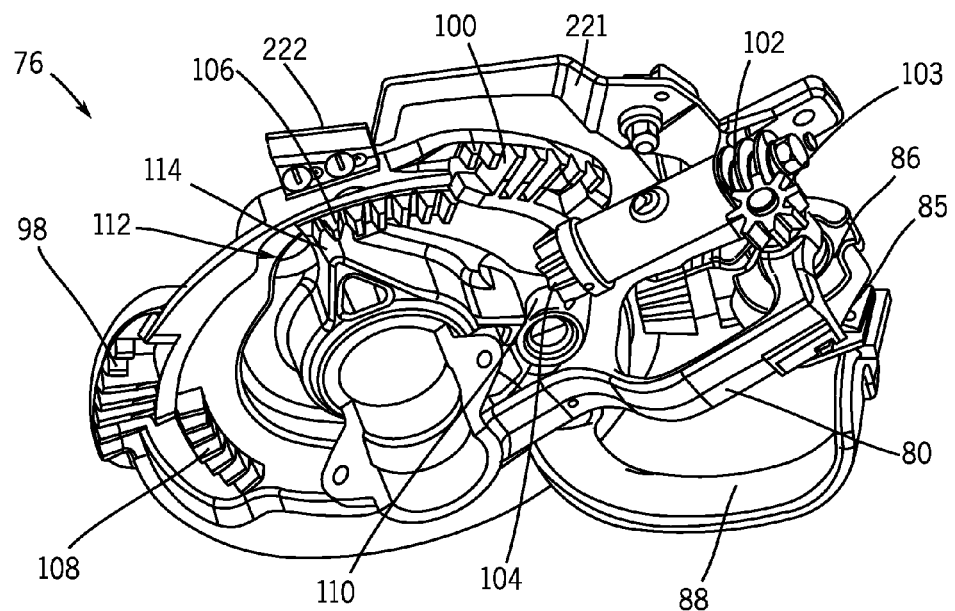
FIGS. 5a and 5b are assembled perspective views of the embodiment of the double knotter system of FIG. 4.
Figure 5B:
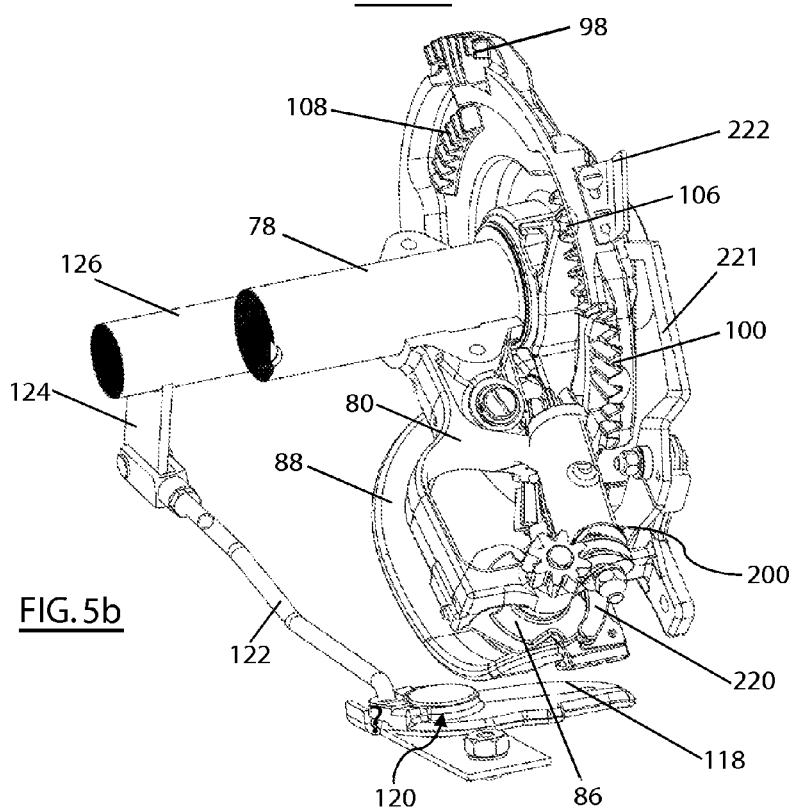
Figure 6:
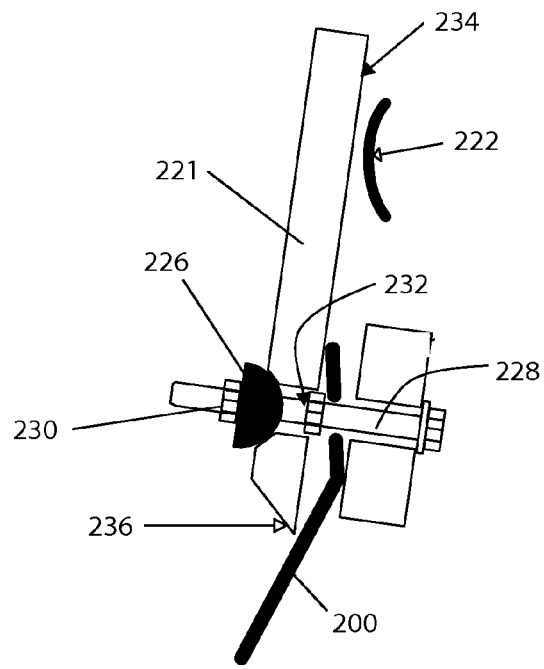
FIG. 6 is a schematic view of the releasing mechanism of the embodiment of FIGS. 4, 5a and 5b.
Figure 7A:
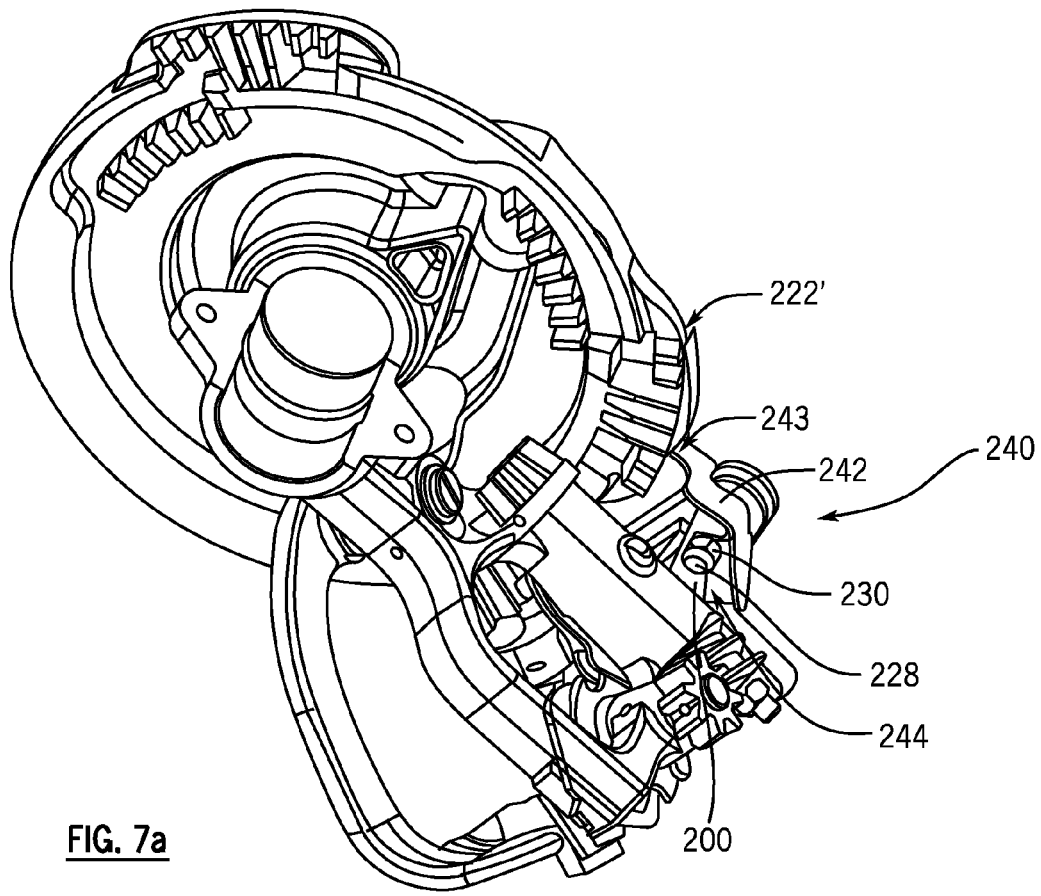
FIG. 7a is a schematic view of a first alternative design of FIGS. 4-6.
Figure 7B:
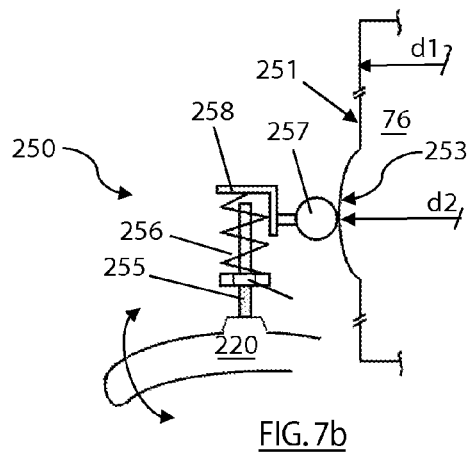
FIG. 7b is a schematic view of a second alternative design of FIG. 4-6.

With this short explanation in mind, the details of the embodiments according to the present invention will now be described. FIGS. 4, 5, and 6 illustrate a first embodiment according to the invention, FIG. 7a illustrates a first alternative embodiment, while FIG. 7b illustrates a second alternative embodiment. For convenience the same reference numerals have been used for referring to similar elements in the different embodiments. The knotter 40 is similar in many respects to the knotter disclosed in EP 1 584 227 in the name of the Applicant, the disclosure of which is herein incorporated by reference.

The knotter 40 of FIGS. 4 and 5 comprises a generally circular element, also called knotter disc 76 that is secured to a drive shaft 78 for rotation with the latter through one full revolution when the clutch 38 is engaged. The shaft 78 is supported by a forwardly inclined frame 80 attached to the top of the bale case 22, and the frame 80 also supports the knotter components for forming the knots in response to rotation of the knotter disc 76.

Briefly, such components include a rotary bill hook member 82, supported by the frame 80 for rotation about an inclined axis 84; a twine disc 86 rearwardly of and adjacent to the bill hook 82 for holding strands 64a and 66a in position for engagement by the bill hook 82 during rotation of the latter; and removal means 93 for sweeping the connected strands from the bill hook 82 connected to an arm 88 pivotally attached to the frame 80 by a bolt 90. The strands 64a and 66a are held in notches 87a, 87b in the rotating twine disc 86 by a retainer or twine holder 220. As is the case with the prior art knotter system as disclosed in EP 1 584 227, the tensioning force of or the pressure applied by the retainer 220 to the twine disc 86 can be adjusted by changing the tension of a leaf-spring 200 when a bolt 210 is loosened or tightened. However, this is a setting which needs to be done manually and the tensioning force or pressure which can be exerted by the spring 200 to the retainer 220 and thus to the twine disc 86 will be the same over the entire knotting cycle. This has the disadvantage that the pressure may be lowered to a specific pressure force needed during specific phases of the knotting cycle, thus being able to form loop knots or half-loop knots, but where a higher pressure is still required to maintain good operation of the knotter during other specific phases of the knotter cycle, e.g. when cutting the twines. Manually loosening or tightening the bolt 210 will thus have the effect that the tension will be ideal in a specific phase of the knotting cycle, while being insufficient in other phases of the knotting cycle.

In the present invention, the tensioning force will be variable throughout the knotting cycle, providing different tensioning forces depending on the specific phase of the knotting cycle. This will be explained further below.

The lower end of the arm 88 is shaped in such a way that it opens away from the twine disc 86 beneath the bill hook 82. The arm 88 further carries a knife 94 between the bill hook 82 and the twine disc 86 for severing the strands 64a and 66a in response to a swinging movement of the arm 88 in the proper direction. Such movement of the arm 88 to operate the knife 94 also serves to bring the removal means 93 in engagement with a knot formed on the bill hook 82 for stripping such knot off of the bill hook 82. The removal means 93 preferably have a shape which is substantially complementary to the shape of the bill hook 82 to improve this sweeping of the bill hook.

In order to transmit driving power to the bill hook 82, the knotter disc 76 is provided with a pinion 96 which is disposed for meshing engagement with a pair of circumferentially spaced gear stretches 98 and 100 on the knotter disc 76. Similarly, driving power is transmitted to the discs of the twine disc 86 through a twine disc pinion 103, a worm gear drive 102 and a bevel gear 104 in position for sequential meshing engagement with a pair of circumferentially spaced gear sections 106, and 108 on the knotter disc 76.

Power to swing the arm 88 about the pivot bolt 90 is obtained through a cam follower 110 at the upper end of the arm 88 beyond the pivot bolt 90 which is disposed within a cam track 112 on the knotter disc 76. A pair of circumferentially spaced cam shoulders 114 in the track 112 are positioned to sequentially engage the follower 110 to operate the latter.

Figure 15:
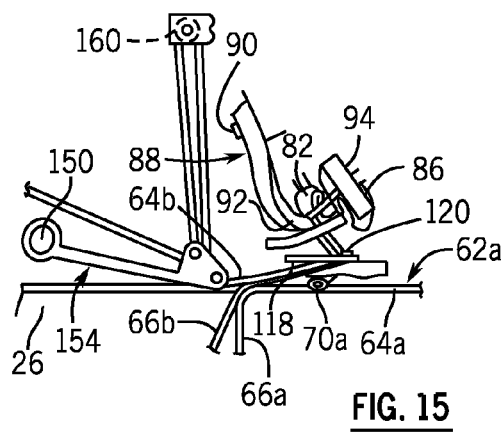

A finger 118 is located below the bill hook 82 and the arm 88 of the knotter 40 and is mounted on an upright pivot 120 for lateral swinging movement between a standby position illustrated in FIG. 8 or 12 and a full-throw, laterally extended position somewhat beyond that illustrated in FIG. 10 or 15. An operating link 122 attached at one end to the finger 118 and at the opposite end to a crank 124 serves to effect swinging of the finger 118. The crank 124 is in turn fixed to a transversely extending shaft 126 that extends to a point behind the knotter disc 76 where it may carry a second crank (not shown). The second crank is biased upwardly in a counter-clockwise direction by a coil spring and carries a cam follower at its outermost end. The follower is in position for operating engagement with a double-lobed cam fixed to the shaft 78 for rotation therewith, its lobes being circumferentially spaced apart in accordance with the desired timed relationship between the finger 118 and the knot-forming components of the knotter 40.

The knotter cleaner 85 may be removed from the knotter system of the present invention. This knotter cleaner 85, shown in FIG. 4 in dotted lines, was primarily needed to remove the cut ends from the twine disk 86 when they were cut in between the forming of two standard knots. These cut ends often remained on the twine disk 86, causing an obstruction during the next tying cycle. Since these ends are no longer cut, they are no longer lying on the twine disk 86, thus making the knotter cleaner 85 redundant. The operator may however decide to leave the knotter cleaner 85 installed, when working in extreme dirty conditions. In that case, the knotter cleaner 85 will be used to remove pieces of crop material or dust or the like from the twine disk 86.

Figure 8:
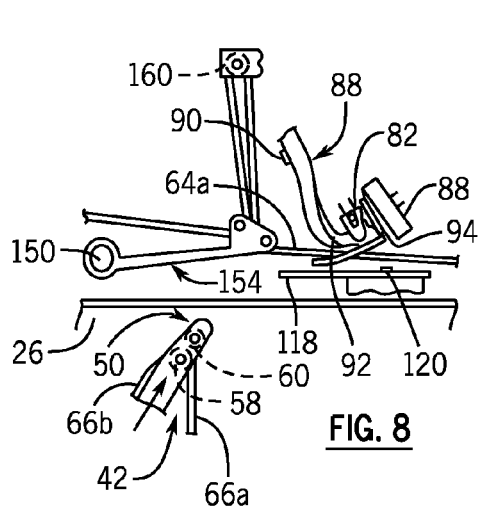
FIGS. 8 to 17 are fragmentary, schematic views illustrating the successive steps of a double-knotting operation.

The condition of the partial loop 62a in FIG. 3, and that of the knotter 40 and the needle 42, corresponds substantially with the condition illustrated in FIG. 8, with the exception that in FIG. 3, the needle 42 is still in its home position. At this point in the bale forming operation, the bale has reached its desired length and it is time to complete the loop around the bale and make the second knot in the loop. It is remarked that at this specific instance, the strand 64a stretches along the top of the bale directly beneath the arm 88 but, at least for all effective purposes, is out of contact with the knotter 40. As illustrated in FIG. 8, as the needle 42 swings upwardly toward the knotter 40, it carries with it the strand 66a as the latter is pulled out of source 74. Note that because the strand 66a is threaded through the eyelet 52 of needle 42, a length of that strand on the twine source side of the needle 42 is also carried upwardly toward the knotter 40, such extra length being hereinafter denoted 66b. While the needle 42 approaches the knotter 40, no additional length of the strand 64a is pulled from the source 72. Even as the tip of the needle 42, and more particularly, the roller 60, snares the strand 64a as illustrated in FIG. 9 and presents strands 64a and 66a in unison to the knotter 40, still no additional length of the strand 64a is pulled from source 72 because the device 154 rocks upwardly in a counter-clockwise direction to provide the slack necessary in the strand 64a to accommodate the needle movement.

Figure 12:
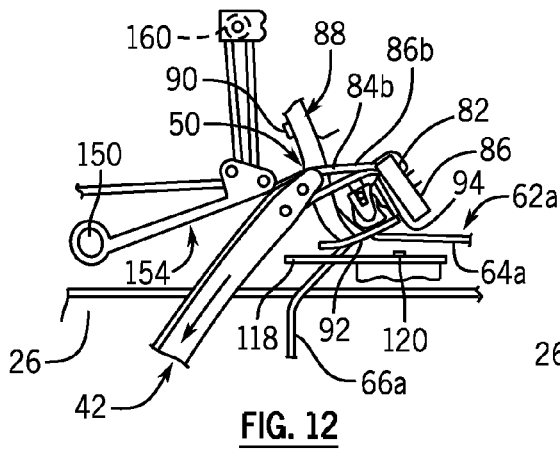

When the needle 42 delivers the strands 64 and 66 to the twine disc 86, the twine disc 86 rotates in such a manner that the strands 64 and 66 are retained twice in different notches 87a, 87b in the twine disc 86, see FIG. 12. By doing so, two knots 70a and 68b can be formed during one knotting cycle as will be explained further, whereby the knife 94 severs the strands 64a and 66a from the strands 64b and 66b after the first knot 70a is formed and the removal part 93 removes the first knot from the bill hook 82, thus separating the two loops from each other.

In the present invention, a spring 200 with limited pressure capabilities is used to maintain a minimum pressure on the twine holder 220 needed to apply the needed amount of tension on the strands when placed in the twine disk 86, rather than using two strong springs, as known in the prior art baler, which press constantly with a high pressure against the twine holder 220. By using a spring with a lower tensioning force, the twines will now be able to be pulled out slightly from the twine disk 86 when the first knot is being formed, while still providing with sufficient tension when the knife needs to cut the twines. The tension by the spring 200 on the twine holder 220 may be eliminated completely, e.g. during specific periods of the knotting cycle as will be described further, such that the spring will only maintain the twine holder in position, as to close of the notches 87a, 87b of the twine disk 86 when the twines are placed in these notches. That way, the twines are not able to escape from the notches 87a, 87b of the twine disk 86, while still allowing the twines to slide inside these notches during the knotting cycle.

Figure 9:
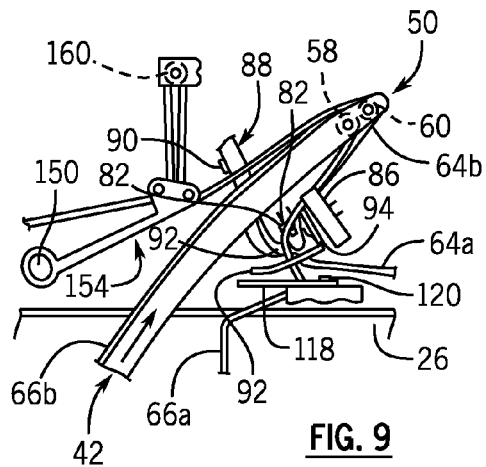
Figure 10:
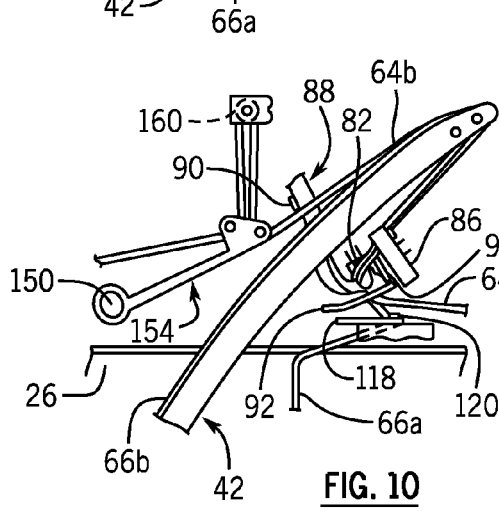

While the strands 64a and 66a are being delivered across the bill hook 82 to the twine disc 86, the finger 118 is actuated to swing inwardly and engage at least the strand 66a as illustrated in FIGS. 9 and 10 so as to assure that the strands 64a and 66a are both in proper position across the bill hook 82. The twine finger will hold the strands 64a, 66a on the bill hook 82 during the whole first knot process.

In presenting the strands 64a and 66a, the needle thus drapes the strands across the bill hook 82 and into the awaiting notch 87a of the twine disc 86, whereupon rotation of co-operating discs in the latter, in combination with the twine holder 220, serve to maintain the strands within the notch 87a of the twine disk 86 and prevent their escape as the bill hook 82 begins its rotation as illustrated in FIG. 10. It is to be noticed that these strands, when draped over the bill hook 82, are such that one strand will be draped over the other. When the bill hook 82 rotates to form the knot, one of the strands will be on the so called inside of the knot, while the other strand will be placed on the outside of the knot and over the inside strand. This has the effect that the strand on the inside will need a shorter length to form the knot than the strand on the outside, which also needs an additional length because it is also draped over the inside strand instead of being able to follow the same shorter path as the inside strand. Also, the strands are twisted with relation to each other when placed in the notch and rotated by the bill hook. This can be seen e.g. from FIG. 9. The twisting of the strands has the result that they lay one behind the other and when being cut by the knife 94, the strands will be cut one after the other. When the strands are going to be cut, the upper lip of the bill hook is still open.

The knife 94 will now cut the strand closest to the knife, while the upper lip starts to close. This will result in a continued pulling on the strand which is not yet cut. Now, the knife will also cut the second strand, but at a slightly later position, resulting in strand ends with different length, one slightly shorter and one slightly longer strand end.

Figure 11:
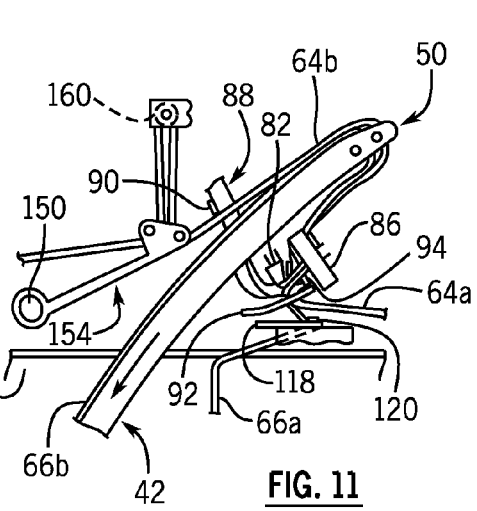

The needle 42 reaches its highest position and starts to go down, see FIG. 11. The twine disc 86 rotates a quarter of a turn and holds the twines 64b and 66b together. During the down travel of the needles the two twines on the back of the needles are placed in the next notch 87b of the twine disc for the second knot (FIG. 12). While the needle goes down, the bill hook rotates to form the first knot. Due to the limited force exerted by the spring 200 on the twine holder 220, the rotating bill hook 82 will now be able to pull a small amount of extra twine out of the twine disk 86, thus lengthening the amount of twine ends which will be available after forming of the first knot and cutting the twine, rather than stretching the twine as was the case when the twine was firmly gripped by the twine holder in the prior art knotter system. The result will be that after cutting of the twine, the free ends of twine connected to the first knot will be longer in the present invention, than was the case in the prior art. In the prior art knotter system, the twine was stretched out and after being cut would shrink again. This had the result that the ends were too short to be able to remain inside the formed knot to form a loop knot or a half-loop knot as is now possible with the present invention.

Figure 19:
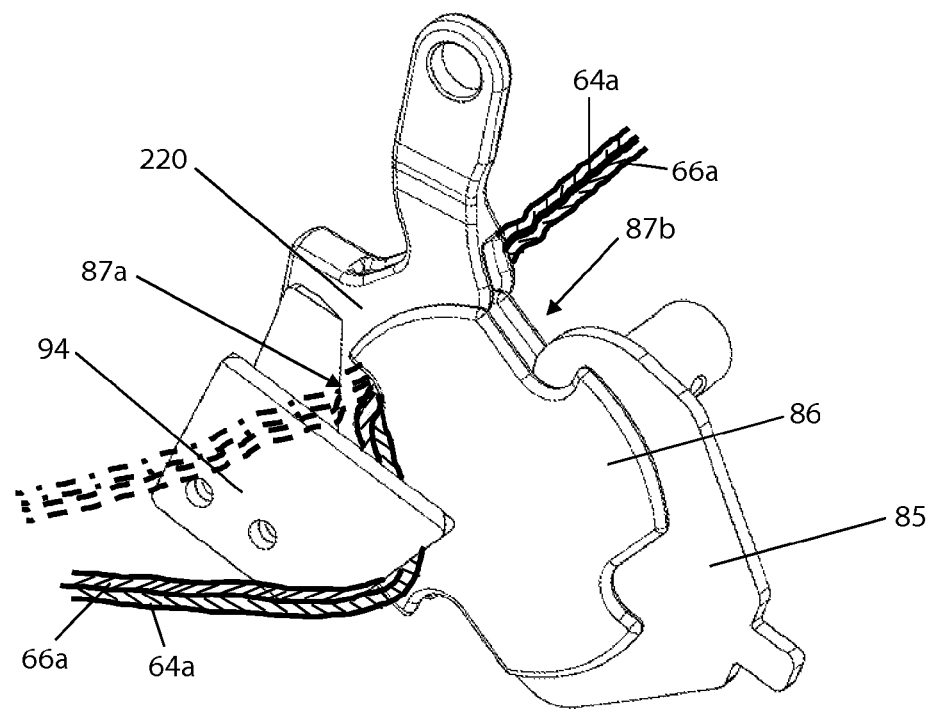
FIG. 19 is an enlarged, top view of the strands of twine held in the twine disk and twine holder and of the position of the strands when being cut by the knife according to the present invention.

Also, when the knife arm 88 swings out to cut the twines under the twine disk 86, the twines 64 and 66 will now be pulled more out of the twine disk 86 due to the movement of the knife arm 88. The knife, now pushing against the twines will no longer be able to cut the twines immediately because of the limited, or even no tension exerted on the twines by the spring 200 and twine holder 220, but will eventually be able to cut the twines because of the position of the twine disk 86. Also, the tension regulating mechanism will now start to apply tension to the twine holder. In the prior art knotter system, the strands were always under tension thus allowing cutting of the strands as soon as the knife would come into contact with the strands. When the knife was cutting the strands in the prior art system, the strands were in line with the position of the notch 87a which held the strands. In the present invention, the tension is no longer present when the knife first touches the strands and the knife will thus push against the strands, rather than immediately cutting them. However, due to this pushing of the knife against the strands, the angle in which the strands are held in the notch 87a will change from straight forward (shown in dotted lines in FIG. 19) to e.g. 45° as shown in FIG. 19. This in combination to tension being applied by the tension regulating mechanism will make it possible for the knife 94 to again cut the strands such that the first formed knot 70a is lose from the remaining twine 64b and 66b.

When forming the knot, the strands 64, 66 are placed around the bill hook 82 in a specific manner. As explained before, when a knot is formed, one strand, e.g. strand 64, will be bend on the inside of the knot, while strand 66 is placed over strand 64. That way, both strands 64 and 66 will need to have a specific minimum length which are different from each other, such that the strands are able to remain inside the knot and to form a loop knot.

In the case of the present invention, due to:
the pulling of the strands 64 and 66 out of the twine disk 86 when forming the first knot and thus no longer stretching the strands but taking the necessary twine length needed to form the first knot;
the delayed cutting action, again due to the fact that the strands are able to be pulled out of the twine disk 86; and
the twisting of the strands and the way they are position with relation to each other when forming the knot, the cutting of the strands will occur at a distance further away from the rotating bill hook 82 and with a slightly different length compared to each other.

Although the length of both cut strands 64a and 66a is longer than with the prior art knotter system, the outer strand 66a being the strand which lays on the outside when the knot is formed, may still be insufficiently long to bend completely over the inner strand 64a, which is the strand that is going to be placed on the inside of the formed knot and which is able to remain with its end inside the formed knot 70a. Thus, the inner strand 64a is of sufficient length and needs to have lesser length, such that this end will now be able to remain stuck in the formed knot. The outer strand 66a may still be not long enough to bend over the inner strand 64a and to remain stuck in the formed knot, resulting in at least an half-loop knot 70a. If both ends reach the minimum required length, e.g. by positioning the knife such that it will contacting the strands under a specific angle which will prolong the pushing action such that the ends are even longer, this will thus result in a loop knot as a first formed knot 70a.

Figure 13:
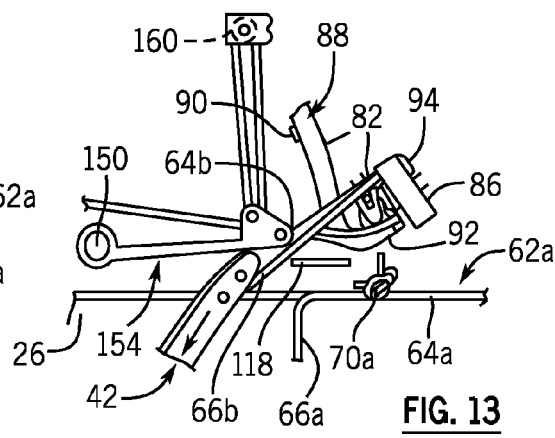

The foregoing described movement on the part of the bill hook 82 and the twine disc 86 are brought about by operable inter-engagement of the gear stretch 98 and the gear section 106 on the knotter disc 76 with their respective gears 96 and 104 on the bill hook 82 and the twine disc 86. Such driving inter-engagement continues until a knot has been formed on the bill hook 82 as illustrated in FIGS. 11 and 12, by which time the needle 42 has begun to withdraw. At this point, the cam shoulder 114 of the knotter disc 76 comes into engagement with the roller 110 of the arm 88 so as to swing the bottom of the latter, and hence the knife 94, across that portion of the strands between the bill hook 82 and the twine disc 86, thereby first pulling the twines out of the twine disk, as explained above. As soon as the knife is again able to cut the strands, it will do so and further motion of the knife arm 88 will now strip the finished knot 70a from the bill hook as illustrated in FIGS. 12 and 13. As already explained above, the first formed knot 70a will now have longer ends 64a, 66a then the first formed knot 70' of the prior art, such that at least one end 64a of the strands will be able to remain stuck in the formed knot 70a, resulting in a half-loop knot or, in case the strand 66a is of sufficient length, in a loop knot.

When the knot 70a is dropped by the knotter 40 following severance and stripping from the bill hook 82, the strand 66b from source 74, as well as strand 64b from source 72 is still retained in the second notch 87b and possibly also in the first notch 87a of the twine disc 86.

It is important that sufficient pressure is exerted on the twine holder 220 once the strands are cut, such that the strands 64b, 66b are still retained at least in the notch 87b when the needle is retracting to place the strands 64b, 66b over the bill hook to start the forming of the second knot 68b.

One also needs to understand that, due to the pushing of the knife against the strands during the formation of the first knot 70a and before actually cutting the strands, an additional end is available hanging out of the first notch 87a. In the prior art knotter system, this end was significantly shorter, since strands were not able to be pulled out of the notches and since the knife is passing close next to the twine disk 86 and cutting the strands almost next to the notch and instantly when the knife was touching the strands. This extra length is important for the formation of a loop knot or a half-loop knot as the second knot 68b.

Figure 14:
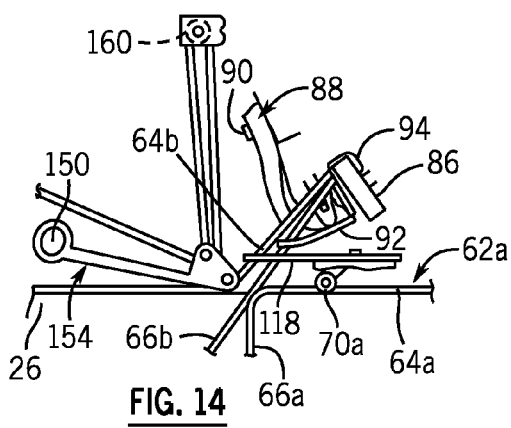

When starting the second half of the knotter cycle to form the second knot 68b, the upper lip 83a is open again. Consequently, as the needle 42 continues to retract, the strand 66b is draped downwardly across the bale chamber 26 thereby pushing the upper lip 83a down because of the pressure of the strands on the upper lip 83a, while the slack take-up device 154 lowers to its normal position to pull a small amount of additional twine from the source 72. Upon reaching the condition illustrated in FIG. 14, the strands 64b and 66b are in position for initiating the second tying cycle which is started by the finger 118 swinging inwardly to engage the strands 64b and 66b and to assure that the strands 64b and 66b are properly positioned across and in engagement with the bill hook 82, see FIG. 15, whereupon the latter and the twine disc 86 are operated by their second respective gear stretch 100 and gear section 108 on the knotter disc 76.

Due to the rotation of the knotter disc 76, a force plate 221 will come into contact with a shoulder 222 which is placed on the outer surface of the knotter disk 76. The location of the shoulder 222 is well defined, such that the force plate 221 will only come into contact with the shoulder at the correct timing during the knotting cycle, being at the moment when the bill hook is approaching its closed position when forming the second knot. When forming the second knot, the tension needs to be released from the twine holder 220, such that it is now possible for the strands to be pulled out of the twine disk and into the knot which is going to be formed. Releasing the tension before this point will result in a failed knot, since the strands need to be held to actually form the knot. This can be seen clearly from the timing diagram of FIG. 20.

Figure 20:
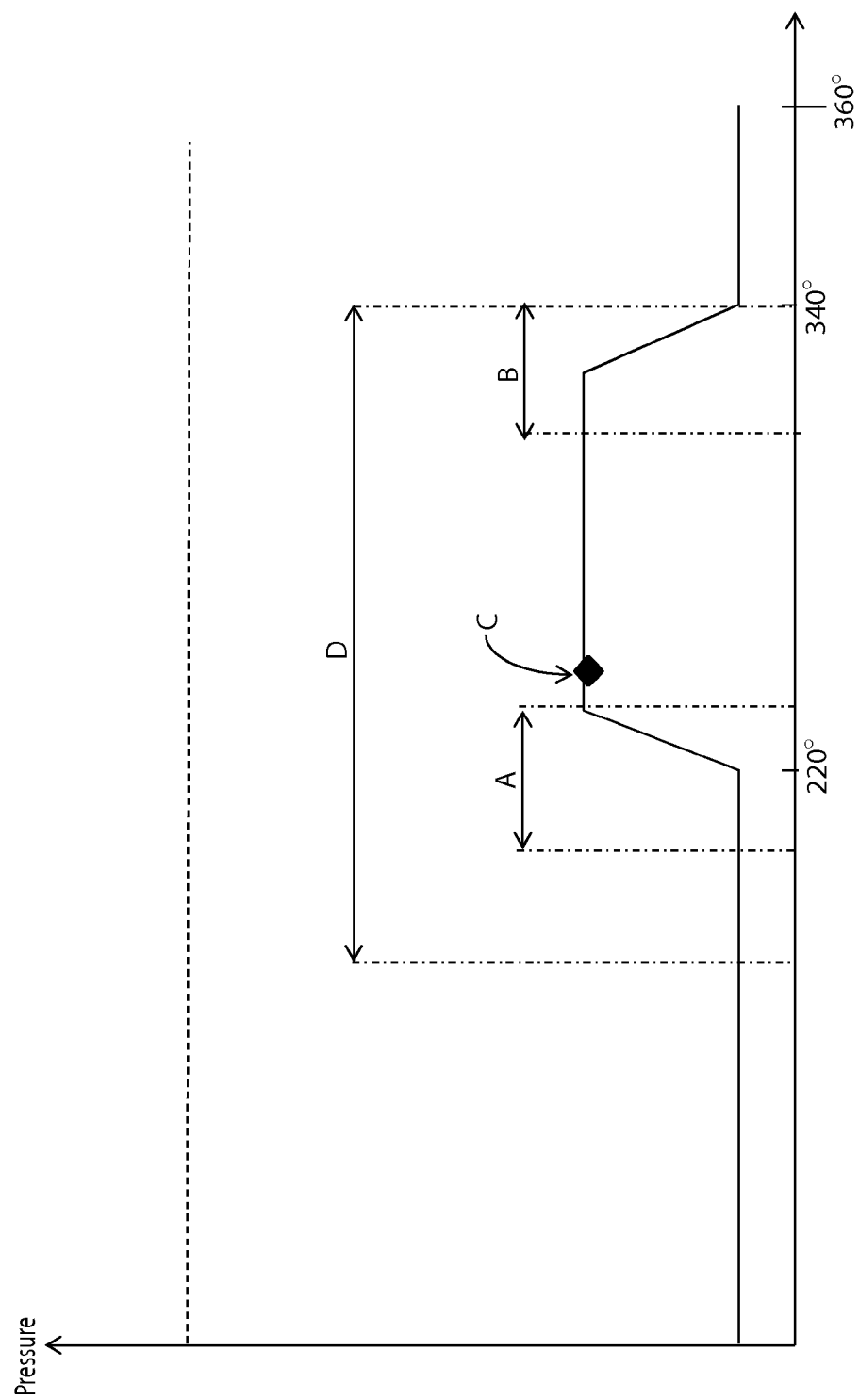
FIG. 20 is a graphical representation of the pressure applied to the twine holder in a prior art knotter system and in the knotter system of the present invention.

In FIG. 20, the dotted line represents the constant high pressure applied by the twine holder to the twine disk of the prior art. The pressure was accomplished by an over-dimensioned spring as was typically the case with the prior art knotter systems.

The continues line represents the pressure applied by the twine holder 220 to the twine disk 86 and is significantly lower, or even non-existing, during the majority of the time, and applied only when needed to be able to form two successive knots. It should also be noticed that the applied pressure is less than with the prior art knotter system, thus making sure that twine damage is avoided or at least reduced as much as possible.

In FIG. 20, a 360° rotation of the knotter disk 76 is represented, showing specific time zones which are relevant when forming two successive knots. Zone 'A' represents the timing when the first knot is being formed, while zone 'B' represents the timing when the second knot is being formed. On timing 'C', the strands of twine are cut by the knife 94. Zone 'D' represents the timing when the strands are placed in the twine disk 86 and are thus likely of damage when pinched in the twine disk. As can be seen from FIG. 20, the pressure to the twine holder 220, and thus to the strands which are held in the twine disk 86, is only applied when the first formed knot is almost completed. The pressure may be applied gradually by having a ramp-like side on the shoulder, allowing a less aggressive contact between the shoulder 222 and the force plate 221 when starting to contact the shoulder 222. This results in a gradually applied pressure to the twine holder 220 with the additional effect that damage to the strands, which are placed in the twine disk 86, is as minimal as possible. Once the first knot is completed, and ready to be cut, the necessary pressure is applied, such that the knife is now able to cut the strands. During the formation of the second knot, the pressure is again gradually lowered such that the strands are now able to be pulled out of the twine disk, such that they can be pulled into the second knot to form a loop knot. It is also important that limited or even no pressure when the knife reaches its cutting position again. The knife still moves with the knife arm to strip of the second knot from the bill hook and would otherwise be able to cut of the strands which are still retained in the twine disk 86. When the pressure is lowered or released, the strands will now be pulled out of the twine disk due to the movement of the knife arm and knife when pushing against the strands.

Although FIG. 20 shows that the pressure applied after cutting the strands remains at the same level until the forming of the second knot, it is possible to lower the pressure again. This is possible since there is no movement of the bill hook or other components which would be able to pull the strands out of the twine disk 86. Once the bill hook starts its second rotation (zone 'B') to form the second knot, the strands need to be held again by the twine holder 220 such that the second knot can be formed.

So, FIG. 20 shows that only sufficient pressure is applied to the strands in a controlled manner and when needed, instead of a constant high pressure as was the case with the prior art knotter system.

The force plate 221 is connected to the same shaft 228 as the spring 200 and both are fixed by the shaft 228 to the chassis of the knotter assembly as schematically shown in FIG. 6. The hole through the force plate 221 is larger than the hole used to secure the spring 200 on the shaft 228. A rounded element 226 is placed on the same shaft 228 on the outer side of the force plate 221 and is forced into contact with the interior of the hole of the force plate 221 by means of a nut 230. The interior of the hole of force plate 221 is edged such that the rounded element 226 is able to fit into the hole. A second nut 232 is placed between the force plate 221 and the spring element 200 for fixating the spring 200 to the frame of the knotter assembly and to regulate the maximum pressure the spring is able to apply to the twine holder 220. The second nut is smaller than the through hole of the force plate 221 such that it is able to be, at least partially, located inside the hole of force plate 221.

The shoulder 222 placed on the knotter disc 76 has an arc-shaped surface, such that the contacting and releasing of the force plate 221 with the shoulder 222 can be done in a smooth, non-aggressive manner. The location of the shoulder 222 on the knotter disk 76 is in the vicinity of the gear section 106, such that the pressure exerted by the spring 200 on the twine holder 220 is lowered when the second knot is being formed.

Now, when a first end 234 of force plate 221 is brought into contact with the shoulder 222 and moves over the shoulder 222, the force plate will be able to pivot over the rounded element 226 resulting in a curved movement because of the fact that the rounded opening of the force plate 221 and the rounded element 226 are working together as a joint. The opposite end point 236 of the force plate 221 will be urged in contact with the spring 200, now pushing the spring 200 away from the twine holder 220 thus releasing the tensioning pressure on the twine holder. When releasing the pressure on the twine holder 220, the strands are pulled out of the notches by the moving bill hook and the knife as was explained earlier. The loose strands will now be able to be pulled inside the second knot which is being formed by the bill hook. Due to the additional length of the strands, these strands will not be pulled completely through the formed knot, but will be retained inside the knot when the knot is tightened, thus forming a loop knot or a half-loop knot if only one of the two strands is retained in the knot.

As an alternative, the shoulder 222 can be made longer, such that the force plate 221 will keep contact with the shoulder over a greater distance. That way, the pressure exerted by the twine holder is lowered or removed over a prolonged period, allowing the twine to be pulled more out of the twine supply by the movement of the knife arm 88.

Also, the shape of the contact surface of the shoulder 222 can be such that the amount of remaining tension force of the spring 220 will vary. When the contact surface of the shoulder protrudes more, the force plate 221 will push more against the spring 200, thus allowing less tension on the twine holder 220. When the contact surface is placed more inwardly, the force plate 221 will not be able to push with full force against the spring 200, such that some pressure is still applied by the spring 200 on the twine holder 220.

Although the shoulder 222 may be longer to prolong the contact between the force plate 221 and the shoulder 222, lengthening the shoulder such that the force plate will come into contact earlier with the shoulder is to be avoided. When the pressure which is exerted by the spring 200 on the twine holder 220 is released to early, this will result in a failed knot. The purpose of the notches is to retain the strands in these positions, such that the bill hook is able to turn and drape the strands such that a knot can be formed. If the strands are not held in the notches during this initial turning of the bill hook 82, the bill hook will not be able to form the knot.

As explained above, both twine ends are now sufficiently long, such that it is no longer possible to pull the ends completely through the formed knot, regardless of the differences between the lengths of the twine ends resulting from the way the twines are held in the twine disk. This setup will result in the forming of a complete loop-knot as the second knot.

Figure 16:
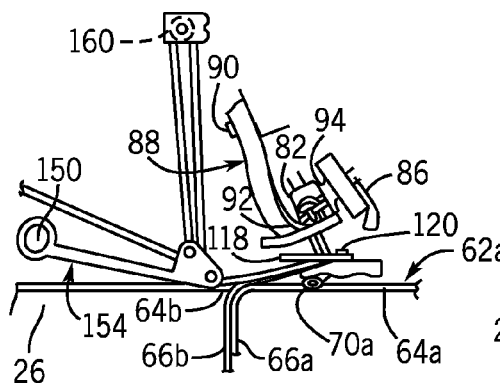
Figure 17:
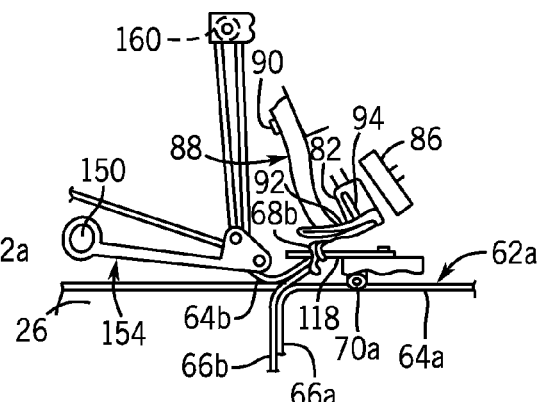

Thus, the second knot 68*b* becomes formed as illustrated in FIG. 16, whereupon the arm 88 is once again actuated, but this time by the second cam shoulder 116. Preferably the pressure of the twine holder 220 on the twine disc 86, the positioning of the shoulder 222 and/or the shape of those elements should be such that a controlled slipping of the strands 64*b* and 66*b* is obtained during the formation of the second knot 68*b*.

Once the force plate 221 is no longer in contact with the shoulder 222, the spring 200 will again be able to exert sufficient pressure on the twine holder, which is now again able to firmly grip the twines. Now the knife is able to cut the twines, because they are no longer movable. Due to the pulling of the twines 64*b* and 66*b* out of the twine disk 86, the twines will be cut at a distance further away from the rotating bill hook 82.

A second shoulder may be foreseen, which will come into contact with the force plate 221 for releasing the pressure completely during the knotting cycle of the first knot 70*a*. During the forming of the first knot, pressure needs to be applied by the twine holder 220 at the moment the knife needs to cut the strands. At that point in time, the strands need to be sufficiently retained in the notches of the twine disc 86 for the knife to be able to cut the strands. If they are not gripped by the twine holder 220 within the notches, the knife arm 88 and knife 94 will be in their home position again without actually being able to cut the strands. When forming the second knot 68*b*, it is important that sufficient pressure can be exerted by the twine holder 220 to retain the strands in the notches of the twine disc, while releasing the pressure when the knife arm starts to move, to prevent that the knife will again cut the strands which are otherwise retained in the notches of the twine disc 76 as was the case in the prior art knotter system.

Therefore, the shape of the contact surface of the second shoulder may be different from the shape of the contact surface of the first shoulder. Also the position of the shoulders on the knotter disc 76 in relation to the gear stretches 98, 100 can be different, since the release of the pressure needs to occur at different timings, depending whether the first or second knot is being formed.

The additional beneficial effect of lowering or even eliminating the tension exerted by the spring 200 and twine holder 220 on the twines during the period on which the twines are placed in the twine disk 86 is that the fibers of the twines will be less damaged. As already said, in the prior art knotter system the twines were firmly gripped or even pinched by the twine holder in the twine disk. This in combination with pulling hard on the gripped twines resulted in damaged twines, especially at those points in the knotter system where 'sharp' or 'hard' corners are available. This damaged twines are considerably weaker. When a finished bale with the closed loop is pushed out of the baler, the compressed crop will try to expand and in the case of damaged twine, the closed loop will rupture at the point where the twine was damaged and thus weakened. If the damage of twine can be avoided, the closed loops will be significantly stronger and able to resist higher expansion forces of the compressed crop.

According to an alternative variant the pressure exerted by the leaf spring 200 could be regulated using a system 240 as shown in FIG. 7a. The system 240 may comprise a contact plate 242 shaped such that one end 243 can be brought into contact with a shoulder 222', while at that time the other end 244 will push against the spring 200 to lower the pressure on the twine holder 220. A bracket 247 having a through hole is connected to the contact plate 242, such that the contact plate 242 can be positioned on the shaft 228, on which the spring 200 is also positioned. The bracket may be constructed as an U-shaped bracket, or a solid bracket, such that a stronger construction is accomplished. The shape of the contact plate 242 needs to be designed, such that, when the first end of the contact plate moves of the shoulder 222', the second end of the contact plate will push against the spring 200. The shoulder 222' may be ramp-shaped, such that a gradual decrease of the pressure is accomplished. Depending on the steepness of the ramp, the speed of decrease of the pressure can be regulated. If the ramp is steep and short, the decrease of pressure will be fast. If the ramp is long and not so steep, the decrease of pressure will take a longer time.

Instead of using a tensioning releasing system, a similar tensioning enforcing system may be used to only provide the required tension on the twine holder 220 when needed during the formation of the first and second knots, while preventing that any pressure is placed on the twine holder and thus the twines when there is no need to do so. As explained above, when forming the first knot, pressure needs to be applied to the twines when the knife needs to cut the strands, while pressure is not needed during the rest of the time when the first knot is being formed. When forming the second knot, pressure is however needed during almost the entire formation of second knot, because the strands need to be maintained in the notches. However, no pressure is wanted when the arm 88 will move back to its home position because it will otherwise cut the strands of which are at that point in time still retained in the notches of the twine disc 86. Therefore, the outer surface 251 of the knotter disc 76 may again be adjusted so that its surface will now take over the function of the shoulders of the previous embodiments. The outer surface 215 may have a bulge 253 such that the diameter increases from the normal diameter, being d1, to a bigger diameter, being d2. As schematically shown in FIG. 7b, a follower mechanism 250 is now connected to the twine holder 220 and brought into constant contact with the outer surface of the knotter disc 76 so that the follower mechanism 250 is now able to follow this outer surface 251. Instead of using a spring 200, the follower mechanism 250 will provide the necessary amount of pressure directly to the twine holder 220 because the follower mechanism 250 will force the twine holder 220 in a specific position. The position and construction of the follower mechanism 250 will be such that the twine holder 220 is able to close the openings of the notches 87a and 87b without actually applying pressure to the twine holder 220. This is the case when the follower mechanism 250 is at the regular outer surface 251, being the surface having the smallest diameter d1. If the follower 250 now reaches a bulge 253 in the outer surface 251, the diameter of the knotter disk 76 will increase from d1 to d2 and the twine holder 220 will pivot around its pivot point 252 towards the twine disk 86 to apply the necessary amount of pressure on the strands which are maintained in the notches of the twine disk 86. The follower 250 can be constructed as a threaded rod 255 fixedly connected to the twine holder 220. A spring 256 is placed over the rod 255 and connected to a bracket 258. An adjustment nut 254 is placed over the threaded rod 255 such that an operator is able to adjust the tension of the spring, such that the required amount of pressure can be applied to the twine holder 220. The amount of pressure may vary when different diameter of twine is used. If thicker twine is used, the twine holder will need to pivot lesser to the twine disk 86, such that there is more space available in the notches of the twine disk 86 to prevent pinching of the strands of twine. By adjusting the tension of the spring, the pivoting of the twine holder 220 is controlled and the correct distance between the twine holder 220 and the twine disk 86 can be accomplished. The bracket 258 is at its turn connected to a cam follower 257. The cam follower 257 is able to follow the surface 251 of the twine disk 86 and will pivot the twine holder 220 around its pivot point 252. The bracket 258 may be constructed as an L-shaped bracket, such that the increase of diameter of the knotter disk 76 can be transferred to the twine holder, which is positioned under an angle of about 90°. Of course different kind of brackets can be used to take account of different positioning of the twine holder 220 with relation to the outer surface 251 of the knotter disk 76.

While the principles of the invention have been set out above in connection with specific embodiments, it is to be understood that this description is merely made by way of example and not as a limitation of the scope of protection, which is determined by the appended claims.

The invention claimed is:

1. A tying mechanism comprising
 a bill hook
 twine holding device-for holding strands of twines;
 a cutting arm adapted for cutting twines between the bill hook and the twine holder whilst moving between a rest position and an extended position;
 a drive adapted to make the bill hook perform at least a first full rotation and a second full rotation and to move the cutting arm from the rest position to the extended position and back during a full operation cycle to form respectively a first and a second consecutive knot;
 wherein the tying mechanism further comprises a tension regulating mechanism which is able to provide and regulate tension exerted to the twine holding-device during operation of the tying mechanism; the twine holding device comprises a twine disk having notches for receiving the strands of twine and a twine holder able to press against the twine disk such that the notches is closeable to retain the strands in the notches and wherein the tension regulating mechanism comprises a spring mechanism pressing against the twine holder to urge the twine holder against the twine disk; and wherein the tension regulating mechanism further comprises a tension releasing mechanism comprising at least one shoulder connected to the drive and a plate, the plate moveable at a first end over the shoulder while pushing at a second end against the spring mechanism, as to release the tension exerted by the spring mechanism on the twine holder.

2. The tying mechanism of claim 1, wherein the drive is a knotter disk, and the shoulder is connected to the outer surface of the knotter disk, such that, when the knotter disk rotates, the plate will be brought into contact with the shoulder initiating the tension releasing mechanism.

3. The tying mechanism of claim 1, wherein the tension releasing mechanism further comprises a shaft, a first and second nut and a rounded element, the shaft interconnecting the spring mechanism with the plate, the first and second nut and the rounded element in such a manner that, when the first end of the plate is brought into contact with the shoulder, the second end of the plate will push against the spring mechanism to release the tension exerted by the spring mechanism on the twine holder.

4. The tying mechanism of claim 3, wherein the plate has a through hole to allow passage of the shaft, the through hole rounded at one end to allow a subsequent connection between the rounded element and the rounded through hole.

5. The tying mechanism of claim 4, wherein the through hole is bigger than the second nut, such that the nut is able to slide, at least partially, into the through hole.

6. The tying mechanism of claim 1, wherein the tension releasing mechanism further comprises a bracket connected to the plate, the bracket having a through hole to receive a shaft, the shaft being placed through the through hole of the bracket and a through hole of the spring mechanism to position the plate with relation to the spring mechanism.

7. The tying mechanism of claim 6, wherein the plate is shaped and positioned in relation to the spring mechanism such that, when a first end of the plate moves over the shoulder, the second end of the plate will push against the spring mechanism to release the tension on the twine holder.

8. The tying mechanism of as claimed in claim 1,
wherein the tension regulating mechanism is able to apply tension to the twine holding-device-during specific timings of the operation of the tying mechanism.

9. A tying mechanism comprising
a bill hook;
twine holding device-for holding strands of twines;
a cutting arm adapted for cutting twines between the bill hook and the twine holder whilst moving between a rest position and an extended position;
a drive adapted to make the bill hook perform at least a first full rotation and a second full rotation and to move the cutting arm from the rest position to the extended position and back during a full operation cycle to form respectively a first and a second consecutive knot;
wherein the tying mechanism further comprises a tension regulating mechanism which is able to provide and regulate tension exerted to the twine holding-device during operation of the tying mechanism; the twine holding device comprises a twine disk having notches for receiving the strands of twine and a twine holder able to press against the twine disk such that the notches is closeable to retain the strands in the notches and wherein the tension regulating mechanism comprises a spring mechanism pressing against the twine holder to urge the twine holder against the twine disk;
wherein the tension regulating mechanism is able to apply tension to the twine holding device-during specific timings of the operation of the tying mechanism;
wherein the twine holding device further comprises a twine disk; wherein the tension regulating mechanism comprises a rod connected to the twine holder and a tension applying mechanism operably connected with the rod, and whereby the tensioning applying mechanism is at its turn operably connected with the drive such that, during specific timings of the operation of the tying mechanism, the tension applying mechanism is able to apply tension via the rod to the twine holding-device.

10. The tying mechanism of claim 9, wherein the drive comprises a knotter disk and the tension applying mechanism comprises a spring element and a cam follower, the cam follower configured to follow the outer surface of the knotter disk.

11. The tying mechanism of claim 10, wherein the outer surface of the knotter disk has at least one bulge such that, when the cam follower is moved over the bulge, the cam follower and spring element will push against the rod, thus urging the twine holder against the twine disk to retain the strands of twine.

12. The tying mechanism of claim 9, wherein the tension regulating mechanism further comprises an adjusting mechanism, placed over the rod to adjust the amount of tension applied by the tension applying mechanism.

13. The tying mechanism of claim 12, wherein the rod is a threaded rod and the adjusting mechanism is a nut placed over the threaded rod, the nut being moveable over the threaded rod to alter its position on the threaded rod such that the tension of the tension applying mechanism is changed.

14. A method of operating a tying mechanism to form respectively a first and second consecutive knot in a rope to form a closed loop around a formed bale of crop material, with a tying mechanism comprising
a bill hook for forming the first and second knot when rotating,
a twine holding device for holding the strands of rope, the twine holding device comprising a twine disk having notches, and a twine holder to close of the notches of the twine disk;
a needle mechanism for delivering strands of rope to the twine holding device a finger for positioning and holding the strands of rope on the bill hook; and a knife arm having a knife for cutting the strands to separate the first from the second knot, and a stripping piece for stripping of the formed knot from the bill hook;
the method comprises the steps of:
moving the needle mechanism upwards to deliver the strands in a first notch of the twine disk, while draping the strands over the awaiting hook;
moving the finger for positioning and holding the strands on the bill hook;
rotating the twine disk to close the first notch and present the second notch to the strands;
rotating the bill hook to commence the forming of the first knot;
moving the needle mechanism downwards to deliver the strands in the second notch of the twine disk;
moving the knife arm to cut the strands after the forming of the first knot and to strip the completed first knot of the bill hook;
moving the needle mechanism further downwards to drape the strands over the awaiting bill hook;

moving the finger for positioning and holding the strands on the bill hook;

rotating the twine disk to close of the second notch;

rotating the bill hook to commence the forming of the second knot; and moving the knife arm after the forming of the second knot to strip the completed second knot of the bill hook;

lowering the tension exerted by the twine holder to the twine disk when the bill hook is rotating to form the first knot, and increasing the tension again when the knife arm reaches its cutting position such that the bill hook is able to pull the strands through the notches of the twine disk allowing easy forming of the first knot while providing additional length of free strands to allow the forming of a half-loop or a loop knot; and lowering the tension exerted by the twine holder to the twine disk when the knife arm starts to move to strip off of the completed second knot of the bill hook, such that the strands are able to be pulled out of the twine disk.

15. The method of claim 14, wherein the step of lowering the tension exerted by the twine holder when forming the first knot commences when the needle mechanism moves upwards and ends when the knife arm reaches the cutting position.

16. The method of claim 14, wherein the step of lowering the tension when forming the first knot ends beyond the original cutting position, such that the strands are first pulled out of the twine disk before being cut.

* * * * *